Feb. 16, 1965
J. O. EAMES
3,169,732
ARRESTING GEAR
Filed Dec. 26, 1963
3 Sheets-Sheet 1
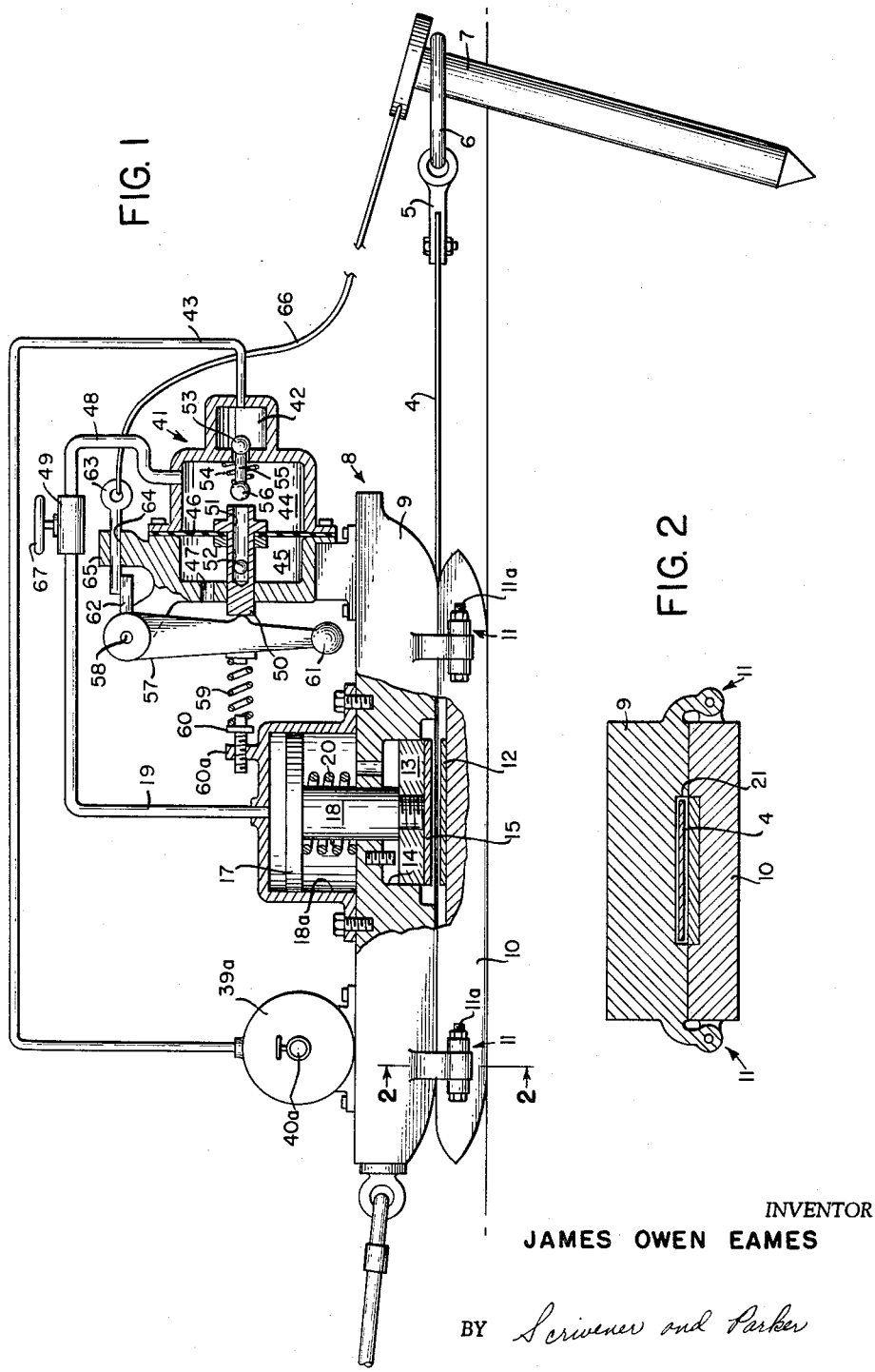
INVENTOR
JAMES OWEN EAMES
BY *Scrivener and Parker*
ATTORNEY

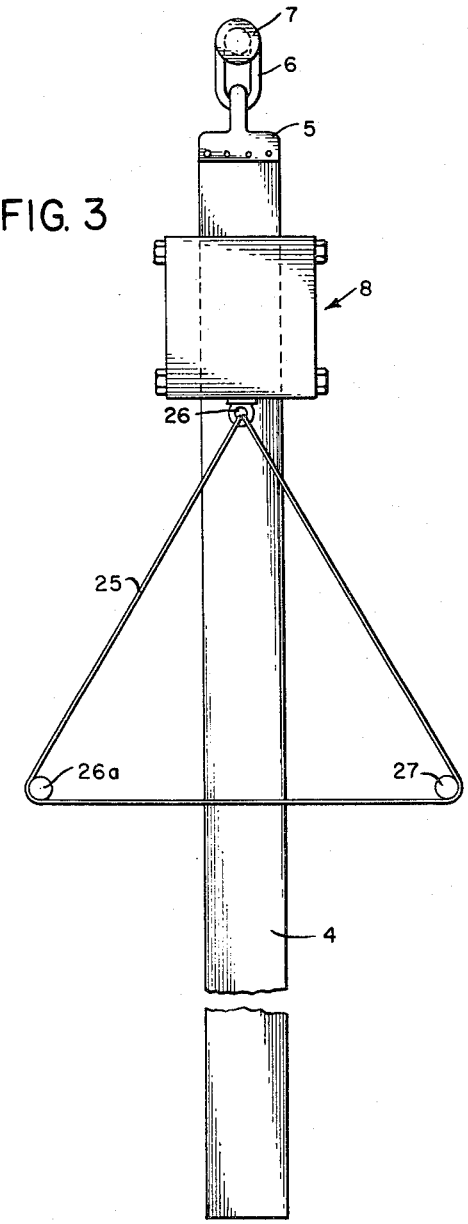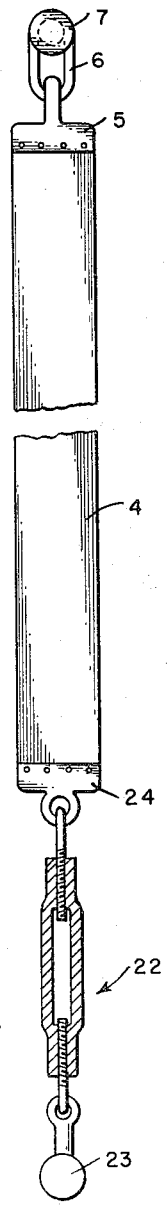

Feb. 16, 1965    J. O. EAMES    3,169,732
ARRESTING GEAR
Filed Dec. 26, 1963    3 Sheets-Sheet 3

INVENTOR
JAMES OWEN EAMES

BY *Scrivener and Parker*
ATTORNEY

United States Patent Office 3,169,732
Patented Feb. 16, 1965

3,169,732
ARRESTING GEAR
James Owen Eames, Washington, Conn., assignor to Roy
S. Sanford & Company, Oxford, Conn., a partnership
Filed Dec. 26, 1963, Ser. No. 333,355
6 Claims. (Cl. 244—110)

This invention relates to arrester gear, and more particularly to arester gear for stopping airplanes on a landing field.

Various types of arrester gear have been proposed or utilized in the past for the above purpose, but many of these have been unnecessarily cumbersome and difficult to install quickly on the landing field, and it is accordingly one of the objects of the present invention to provide arrester gear which can be readily and quickly installed.

Another object of the invention is to provide an arrester gear which is portable and which may be quickly removed from one field and installed on another field without particular difficulty.

A further object of the invention is to provide arrester gear of the above type wherein means are provided for automatically maintaining a substantially uniform deceleration rate on an airplane which engages the arrester gear.

Still another object of the invention is to provide adjustable control means carried on the arrester gear for selecting the rate of deceleration in accordance with the type of airplane being stopped on the landing field.

A still further object of the invention is to provide arrester gear wherein a sled is slidably mounted on a thin flexible metal strip with the control mechanism for the arrester gear being carried entirely on the sled.

Another object of the invention is to provide an arrester gear wherein a flexible thin flat metal strip is stretched along the runway and engaged by a sled movable thereon by an airplane, the strip being sufficiently flexible to be readily wound into a compact coil for transportation to a different location.

A further object of the invention is the inclusion of means for rendering the arrester action of the gear ineffective during initial engagement by the airplane in order to prevent sudden unnecessary strain on various parts of the gear and on the airplane.

Another object of the invention is to provide arrester gear of the above type which will safely arrest the movement of a landing airplane even though the path of the plane is not in alignment with the metal strip of the arrester gear.

Still another object of the invention is the provision of arrester gear which is low in cost and in which the wearing parts can be readily replaced.

A further object is the provision of arrester gear which is adapted to efficiently dissipate the heat of friction due to braking without damage to the friction elements of the arrester gear.

Another object is the provision of arrester gear so constituted as to reduce to a minimum the strain placed on a landing airplane by the arrester gear.

These and other objects of the invention will be more readily understood when considered in the light of the following description when taken in connection with the accompanying drawings.

In the drawings, wherein similar reference characters refer to similar parts throughout the several views;

FIG. 1 is a schematic representation, partially in section, of a portion of the arrester gear including control mtchanism;

FIG. 2 is a partial sectional view of FIG. 1 taken along line 2—2, but without including the control mechanism;

FIG. 3 is a schematic plan view of the arrester gear showing a sled adapted to slide along a thin and flexible metal strip secured on the runway;

FIG. 4 is a plan view of a thin flexible metal strip stretched along the runway and tensioned by a suitable tensioning means;

Figure 5:
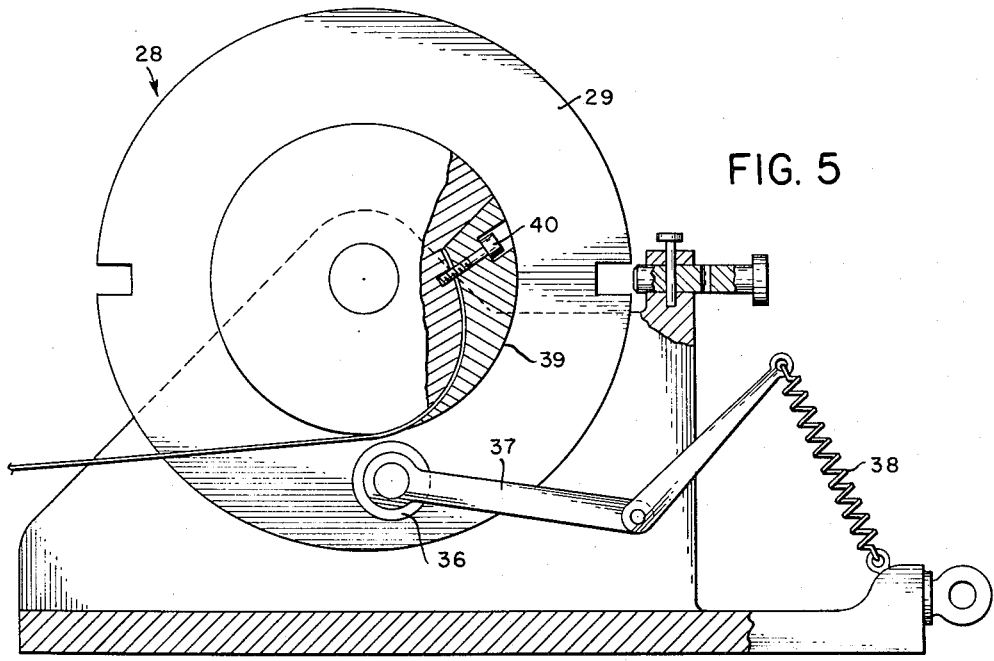
FIG. 5 is a side elevational view of a winch or reel adapted to coil the flexible metal strip to permit ready transportation of the strip from one field to another.

One of the principal features of the invention is the provision of arresting means so constituted as to be readily portable and easily installed, and referring to FIG. 1, such mechanism is shown as including a thin and flexible flat metal strip 4, preferably of steel and having sufficient flexibility to permit coiling into a compact coil for transportation, the strip having a fitting 5 secured at its right end and connected by a suitable link 6 to anchor 7, which may be a stake, or any suitable anchor buried in the ground in well-known fashion. The strip 4 is extended substantially along the center of the runway and lies flat upon the surface thereof. A sled 8 including an upper member 9 and a lower member 10 secured together by hinges 11 and hinge pins 11a is slidably mounted for movement on the runway along the strip, the lower member 10 carrying a brake lining friction element 12 below the strip 4, and the upper member being provided with a movable brake shoe 13 guided in a recess 14 in the upper sled member and provided at its lower end with a friction element 15. The brake shoe is actuated by a piston 17 through a connecting rod 18, the piston being slidably mounted in a cylinder 18a adapted to receive fluid pressure through a conduit 19, and being normally held in retracted position by means of a return spring 20 as shown. As indicated in FIGS. 1 and 2, the flat metal strip 4 extends through a channel 21 formed in the lower side of the sled member 9, and the sled is free to slide along the flat metal strip 4 and along the runway without appreciable friction until the brake shoe 13 is moved downward by the piston 17 to effect engagement of the friction element 15 with the upper side of the flat metal strip and to force the latter downward against the friction element 12 on the lower sled portion 10 to provide a braking action to retard the movement of the sled along the strip to the left.

It will be noted from FIGS. 1 and 2, that the sled members are hinged together on both sides symmetrically, so that if it is desired to remove the sled from the metal strip, the hinge pins of the hinges 11 on either side of the sled can be removed in order to permit separation of the upper and lower sled portions to facilitate such removal.

Although the metal strip 4 may be laid along the runway and anchored only at the right end as shown in FIGS. 3, it is preferred that the strip be anchored at both ends as shown in FIG. 4, and that means such as a turnbuckle 22 be provided at one end or the other of the metal strip in order to provide for tensioning the strip to stretch it tightly between the anchor 7 and an anchor 23 at the left end of the strip, the left end of the strip in this case being provided with a suitable fitting 24 adapted to be connected with the turnbuckle as shown. It should also be noted that by virtue of the arrangement of the connections on the fittings 5 and 24 at either end of the strip, the strip can swivel or twist somewhat about its longitudinal axis in the event the path of movement of a landing airplane is at one side or the other of the center line of the strip in its normal position, thus allowing the strip to adjust itself to varying paths of the airplane within reasonable limits.

As shown in FIG. 3, a cable 25 is connected to a sled eye 26, and is looped around posts or stanchions 26a and 27 in well-known manner, and in such a way that the portion of the cable extending between the stanchions 26a and 27 is raised above the surface of the runway at a height wherein it is adapted to be engaged either by the landing gear of an airplane or by a hook on the tail of the airplane, this being a well-known arrangement which does not require detailed description, as various arrangements can be used without departing from the spirit of the invention. It will also be noted that if desired, the entire sled assembly can be housed in a pit below the surface of the runway in order to provide a clear landing space for an airplane. This is believed to be a well-known expedient which does not require detailed description or disclosure.

Figure 6:
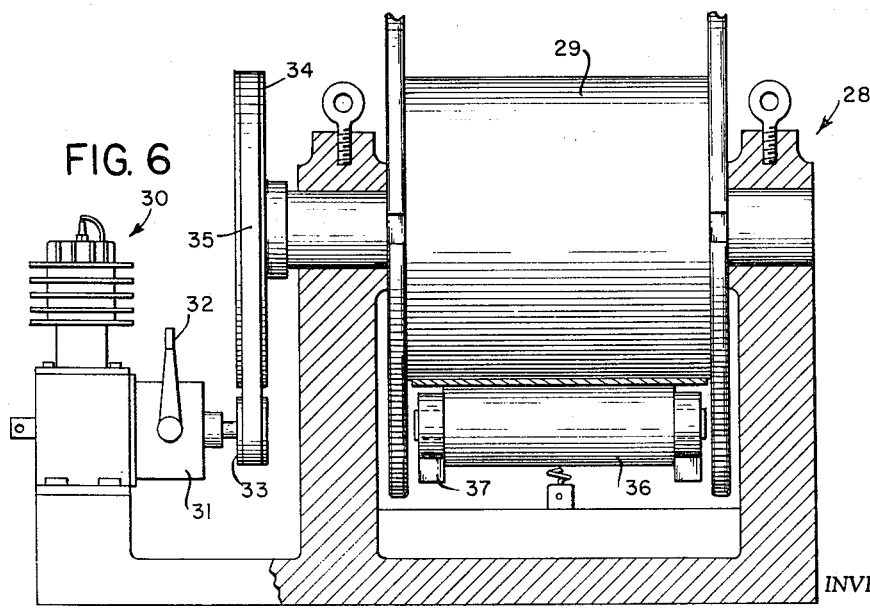
FIG. 6 is an end elevational view of the winch or reel shown in FIG. 5.

As stated heretofore, an important feature of the invention is a construction which provides for ready portability, and to this end it is desirable that means be provided for readily coiling the metal strip for transport, and for uncoiling it for installation on a runway. Referring to FIGS. 5 and 6, such provision may include a winch or reel assembly 28, having a winch member 29 adapted to be driven by a gasoline engine 30 through a clutch 31 controlled by lever 32, and thence through pulleys 33 and 34 and belt 35. As shown particularly in FIG. 5, a roller 36 mounted on bell crank 37 and biased against the barrel of the winch by spring 38 tends to form the strip into a tight coil on the reel during the wind-up operation, and at the same time tends to control the unwinding of the strip when it is desired to install it on a landing field. The strip can be pulled from the reel by any suitable vehicle, such as a truck. On removal of the end fitting 5, the strip may be anchored to the reel of the winch by means of clamp 39 and bolts 40 as shown, and when the strip is wound upon the reel, it can be readily loaded onto a truck and carried to another location. Regardless of the means provided for transport of the metal strip from one location to another, it will be understood that it is essential that the strip be sufficiently thin and flexible to permit coiling into a coil or reel of small diameter, the width of the strip being chosen to provide sufficient strength and area.

It is considered desirable that the braking or retarding action be so controlled as to provide for substantially uniform deceleration rates for a given setting of the control mechanism on the sled, regardless of the weight or nature of the airplane being retarded, assuming of course that the braking capacity of the sled is sufficient for the weight of the airplane being retarded and that such capacity is not exceeded. To this end, a fluid pressure reservoir 39a is mounted on the sled as shown, and is adapted to be filled with fluid under pressure such as compressed air through a valve 40a. Control of the pressure in the cylinder 18a is provided by a self-lapping brake valve 41, this including a housing having an inlet chamber 42 connected to the reservoir by a conduit 43, an outlet chamber 44, and a discharge or exhaust chamber 45 separated from the outlet chamber by means of a flexible diaphragm 46, the discharge or exhaust chamber being connected to atmosphere through a port 47, and the outlet chamber being connected to the cylinder 18a by means of a conduit 48 having an adjustable choke valve 49 connected in series therein for reasons which will be more fully described hereinafter. The diaphragm 46 is clamped to the housing at its outer periphery, and its central portion is clamped to a plunger 50 having a bore 51 opening into the outlet chamber 44 at the right end, and opening into the exhaust chamber 45 through a port 52 on the left side of the diaphragm. The flow of fluid under pressure between the inlet chamber 42 and the outlet chamber 44 is normally prevented by means of an inlet valve 53 biased to closed position by means of a spring 54, the inlet valve being connected by a stem 55 to a normally open exhaust valve 56.

From the foregoing, it will be apparent that with the parts in the position shown, the reservoir 39a will be isolated from the cylinder 18a, while the cylinder will be connected to atmosphere through the conduit 48, the outlet chamber 44, the bore 51, the port 52, the exhaust chamber 45 and the exhaust port 47. On movement of the plunger to the right, the plunger will engage the exhaust valve 56 to prevent communication between outlet chamber 44 and exhaust chamber 45, and will thereafter move the entire inlet-exhaust valve assembly to the right to open the inlet valve 53 to connect the reservoir with the cylinder 18a through the conduit 43, the inlet chamber 42, the inlet valve 53, the outlet chamber 44, and the conduit 48.

It will also be noted that, assuming for the moment that a valve control lever 57 is free to swing about an axis 58 in either direction, a graduating spring 59 is interposed between the left side of the lever and an adjustable abutment 60 mounted in boss 60a, a portion of the right side of the lever 57 abutting the left end of the valve plunger 50. Consequently, it will be apparent that for a given adjustment of the graduating spring 59, the plunger 50 will be urged to the right with a predetermined force to close the exhaust valve and open the inlet valve, and that when the pressure in outlet chamber 44 acting on the diaphragm is sufficient to move the plunger to the left against the force of the graduating spring, the inlet valve will close and a pressure proportional to the force exerted by the graduating spring on the plunger will be maintained in chamber 44, this pressure being different for each different adjustment of the graduating spring. Thus, the abutment 60 can be adjusted in such a manner as to normally provide any predetermined pressure, within the limits of the control valve, in the cylinder 18a when the sled is stationary or is moving at uniform speed and is not being accelerated or decelerated.

In the event the sled is accelerating, however, the lever 57 which is provided with an inertia weight 61 at the lower end thereof, will swing to the right or counterclockwise and the plunger 50 will be urged to the right with the combined force of the spring and the inertia force built up by the weight 61 in the lever 57, thus increasing momentarily the pressure supplied by the brake valve to the brake cylinder 18a in order to increase the braking effort and reduce such acceleration of the sled. If, on the other hand, the sled tends to decelerate due to an over braking condition, the lever and weight 61 will tend to swing to the left or clockwise to reduce the force exerted on the plunger 50 by the graduating spring 59, and the braking force will be reduced to allow acceleration of the sled to the previous uniform velocity.

If no further provisions were made for the control of the pressure in the brake cylinder 18a, it will be apparent that when the sled is suddenly accelerated following engagement of an airplane with the cable 25, the lever 57 will tend to swing quickly to the right and operate the valve mechanism to supply a very high pressure to the brake cylinder 18a, which might result in a sudden brake application sufficient to rupture the metal strip 4 or cause damage to the mechanism or to the airplane, and accordingly it is considered desirable to provide means for preventing the application of pressure to the cylinder 18a until the sled has approached or reaches the speed of the airplane. To this end, means are provided for locking the lever 57 in the position shown to disable the control mechanism until the sled has been moved to the left along the metal strip a predetermined distance, so that when first engaged by a landing airplane, the sled is free to slide along strip 4.

Thus, a lug 62 is provided at the upper end of the lever 57 as shown, and a pin 63 is slidably mounted in a bore 64 in a boss 65 on the brake valve housing, this pin overlying the lug 62 in such a manner as to prevent counterclockwise rotation of the lever from the position shown until the pin is removed, thus preventing any action of the lever and graduating spring to operate the brake mechanism to supply fluid under pressure to the cylinder until such time as the pin has been pulled out of engagement with the lug 62. This removal of the pin is readily accomplished by connecting the right end of the pin to the anchor 7 by means of a cable or cord 66, the length of the cord being so chosen as to render the brake valve ineffective until the sled is moved a predetermined distance from the anchor 7.

It is also considered desirable to avoid a sudden application of fluid under pressure to the brake cylinder 18a under certain circumstances, and when this arrangement is desired, an adjustable choke valve 49, heretofore referred to, is connected in series in the conduit 48 and may be so adjusted by means of adjusting handle 67 as to retard the pressure built up in the cylinder 18a to a safe rate as desired, and in the event of a sudden application of the brake valve 41 to apply fluid pressure to the brake cylinder, this choke valve provides a safeguard against a sudden brake application which might otherwise cause damage to the apparatus.

It is desired to point out one particular and interesting feature of the invention, and that is the action which occurs in connection with the sled and metal strip when the airplane path is at one side or the other of the normal center line of the strip, it being noted that in the event the sled is pulled sideways with relation to the strip, the strip twists about its connections at each anchor and permits the sled to slide along the strip without damage to the strip or the sled, the strip tending to stretch to permit this action. This is an important feature, as it is well-known that the airplane cannot land with sufficient accuracy at all times to be in line with the longitudinal center line of the strip.

Under this condition of operation, the sled may rock to one side or the other, depending on the path of movement of the airplane, and slide on one edge or side on the runway, or in some instances may rise above the runway slightly. Under these conditions, the metal strip presents a warped surface, the degree of warping being dependent on the degree of twist permitted by the connections at either end of the strip, and on the deviation of the path of movement of the airplane to one side or the other of the strip. In any case, the flexibility of the metal strip contributes materially to the satisfactory operation of the retarder under adverse conditions.

With regard to the effective dissipation of heat, it will be noted that the surface of the strip engaged by the brake shoes is constantly changing, the strip ahead of the sled being cool, and the area of the strip heated by engagement with the brake shoes being immediately exposed to the air behind the sled as the latter moves along the strip. Thus a cool portion of the strip is continuously presented to the brake shoes and is immediately cooled thereafter, elimiating the possibility of damage to the strip due to overheating. This novel action also prevents overheating of the friction elements on the brake shoes, as a larger percentage of the heat developed is carried away by the metal strip.

Numerous arrester gears have been proposed and utilized, but in some of these inertia has been a serious problem, due to large masses which had to be accelerated in a very short period of time, thus subjecting the mechanism as well as the airplane to unusually heavy loads. This objection has been overcome by the present invention since the metal strip does not have to be accelerated, and the sled, which is the only part to be accelerated, can be made for the most part of light metal, such as aluminum. For example, the bottom portion 10 of the sled, which slides on the runway, might be made of steel or malleable iron, and substantially all of the other parts might be made of aluminum.

In the drawings, referring particularly to FIG. 1, the parts such as the control valve are shown as being exposed and vulnerable to damage in case the sled were tipped over. It will be understood that the parts are so shown to permit clarity of description, and that in actual use the parts would be positioned differently and would be protected by a suitable housing.

While the invention has been illustrated and described with considerable particularity, it will be understood by those skilled in the art that various changes may be made therein without departing from the spirit of the invention. Reference will, therefore, be had to the appended claims for a definition of the limits of the invention.

What is claimed is:

1. Aircraft arrester gear for use on an aircraft runway including an elongated flat flexible metal strip laid along the runway, said metal strip being sufficiently thin and flexible to permit rolling the strip into a compact coil for transport, means for anchoring at least one end of the strip, and a sled slidably mounted on the strip normally positioned adjacent said one end thereof and having means associated therewith engageable by a landing aircraft, said sled including friction brake shoes engageable with the metal strip and power means carried on the sled for effecting frictional engagement of the shoes with the metal strip, the sled also including power control means for controlling the degree of power applied to said brake shoes by said power means, said control means including means responsive to accelerations and decelerations of the sled to respectively increase or decrease the power applied to said brake shoes by said power means.

2. Aircraft arrester gear as set forth in claim 1, which includes in addition, means associated with the control means for preventing the application of power to said shoes until the sled has been moved along the metal strip a predetermined distance from said one end thereof.

3. Aircraft arrester gear as set forth in claim 1, wherein said power means includes a source of fluid pressure, a fluid motor for actuating said brake shoes, a control valve having a connection with said source of fluid pressure and a connection with said fluid motor and operable to control the pressure of fluid in the motor, and valve control means associated with the valve including means for maintaining a predetermined pressure in the motor when the sled is moving along the strip at a uniform speed.

4. Aircraft arrester gear as set forth in claim 1, wherein said power means includes a source of fluid pressure, a fluid motor for actuating said brake shoes, valve means having a connection with said source of fluid pressure and a connection with said fluid motor and operable to control the pressure of fluid in the motor, valve locking means operable prior to initial movement of the sled by a landing aircraft to render the valve means ineffective to supply fluid under pressure from the source to the motor, means operable on movement of the sled a predetermined distance from said one end of the strip to disable said locking means, and valve control means associated with the valve means for maintaining a predetermined pressure in said motor when the sled is moving along the strip at a uniform speed.

5. Aircraft arrester gear for use on an aircraft runway including an elongated flat flexible metal strip extending along the runway and secured at each end to an anchor on the runway, said strip being sufficiently thin and flexible to permit rolling of the strip into a compact coil for transport, a sled normally positioned at one end of said strip and having means associated therewith engageable by a landing aircraft, brake shoes on the sled adapted for frictional engagement with the upper and lower surfaces of said strip for retarding movement of the sled therealong, a fluid motor associated with said shoes for effecting frictional engagement of the shoes with said upper end lower surfaces of said strip, a source of fluid under pressure on the sled, a self-lapping brake valve connected to said source and to said motor for controlling the pressure in the motor, means for adjusting said valve to maintain a predetermined pressure in the motor when the sled is moving along said strip at a uniform speed, and inertia operated valve control means responsive to accelerations and decelerations of the sled along said strip for actuating said valve to raise the pressure in said motor in response to acceleration of the sled and to lower the pressure in said motor in response to deceleration of said sled.

6. Aircraft arrester gear for use on an aircraft runway as set forth in claim 5, including means operable when the sled is positioned at said one end of said strip for locking the control valve in a position to disconnect said motor from said fluid pressure source and for connecting said motor to atmosphere, and means operable on movement of said sled a predetermined distance from said one end of said strip for disabling said locking means.

References Cited by the Examiner
UNITED STATES PATENTS

| | | | |
|---|---|---|---|
| 2,789,780 | 4/57 | Cotton et al. | 244—110 |
| 2,939,656 | 6/60 | Fulton et al. | 244—110 |
| 2,979,163 | 4/61 | Van Zelm et al. | 244—110 X |

MILTON BUCHLER, *Primary Examiner*.
ANDREW H. FARRELL, *Examiner*.